United States Patent [19]

Shippen

[11] Patent Number: 5,511,765
[45] Date of Patent: Apr. 30, 1996

[54] CUTTING TORCH ATTACHMENT FOR FACILITATING CUTTING CIRCULAR HOLES

[76] Inventor: William G. Shippen, 4412 N. State Rd. 17, Pretty Prairie, Kans. 67570

[21] Appl. No.: 504,771

[22] Filed: Jul. 20, 1995

[51] Int. Cl.[6] ................................................. B23K 7/10
[52] U.S. Cl. .......................................... 266/70; 266/48
[58] Field of Search ............................. 266/48, 66, 70, 266/71, 76, 77

[56] References Cited

U.S. PATENT DOCUMENTS

| | | | |
|---|---|---|---|
| 1,359,155 | 11/1920 | Davis | 266/70 |
| 1,564,636 | 12/1925 | Smith | 266/70 |
| 1,780,814 | 11/1930 | Cregger | 266/70 |
| 1,792,317 | 2/1931 | Marsh | 266/70 |
| 2,596,133 | 5/1952 | Donahue et al. | 266/70 |
| 2,743,101 | 4/1956 | Clark | 266/70 |
| 4,157,814 | 6/1979 | Miller | 266/70 |
| 4,283,043 | 8/1981 | Kalian | 266/66 |
| 4,621,792 | 11/1986 | Thurston | 266/70 |
| 5,360,201 | 1/1994 | Balentine | 266/70 |

FOREIGN PATENT DOCUMENTS

| | | | |
|---|---|---|---|
| 223932 | 1/1958 | Australia . | |
| 404045 | 11/1909 | France | 266/70 |

*Primary Examiner*—Scott Kastler
*Attorney, Agent, or Firm*—John R. Flanagan

[57] ABSTRACT

An attachment used with a cutting torch having a plurality of tubes extending between a handle portion and a head portion of the torch facilitates cutting of circular holes with the torch. The attachment includes a C-shaped support member having spaced bottom and top portions. A variety of center locating members may be secured one at a time by a set adjustment member to the bottom portion of the support member. A clamping member is rotatably mounted on a lower end of an actuating stem that extends through a vertical bore defined through the top portion of the support member. By turning the stem the clamping member is moved downward to clamp the tubes of the cutting torch between the clamping member and the bottom portion of the support member. The attachment is adapted to clamp onto a cutting torch having two or more tubes aligned in the same vertical plane or having three tubes arranged in a triangular configuration. A plurality of concave recesses are defined on a lower surface of the clamping member and an upper surface of the bottom portion of the support member for engaging the tubes. Additionally, instead of a center locating member, a guide fixture rod may be secured by the set adjustment member to the bottom portion of the support member to adapt the attachment to enable the torch to be used to cut straight lines.

20 Claims, 2 Drawing Sheets

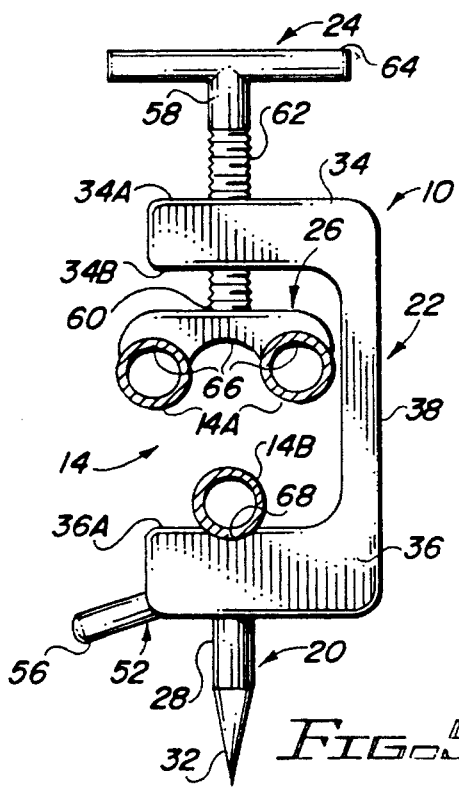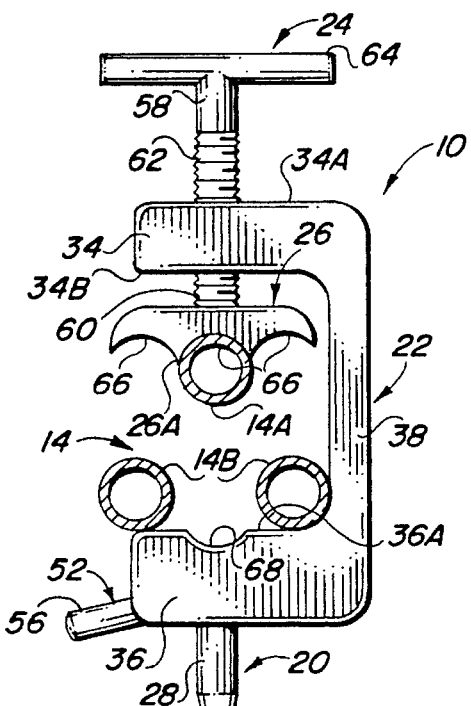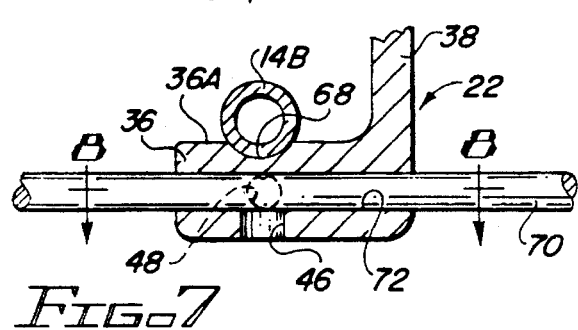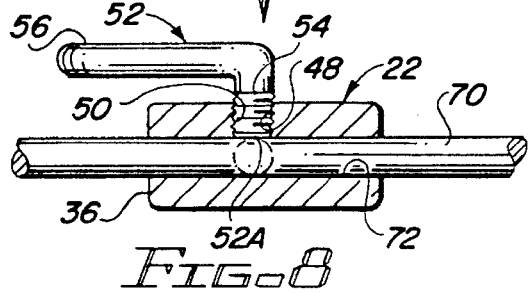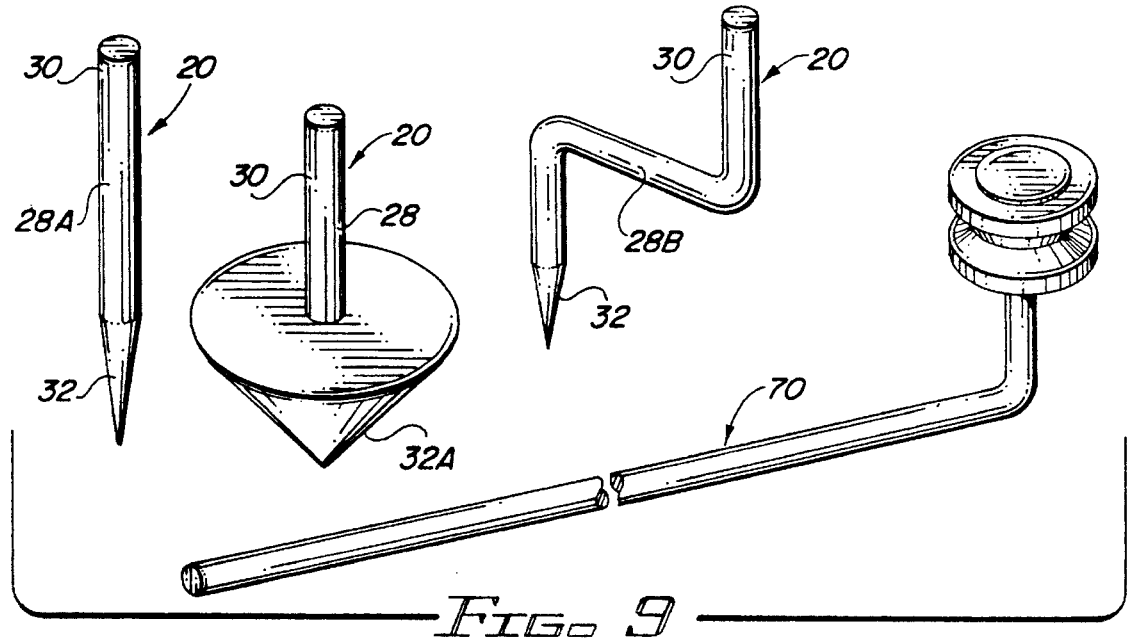

5,511,765

CUTTING TORCH ATTACHMENT FOR FACILITATING CUTTING CIRCULAR HOLES

BACKGROUND OF THE INVENTION

1. Field of the Invention

The present invention generally relates to a cutting torch and, more particularly, is concerned with an attachment for the cutting torch that facilitates cutting of circular holes with the torch.

2. Description of the Prior Art

Using a cutting torch freehand to cut accurate circles or circular arcs in metal plate is a very difficult task, even for an experienced welder. It is possible to inscribe the desired circle or arc on the metal plate before cutting. However, this approach still requires the welder to follow the inscribed circle or arc freehand thereby reducing accuracy and it also involves the extra step of inscribing the circle or arc on the metal plate.

A second and better approach utilizes an attachment which helps the welder guide the head of the cutting torch through the desired circular path. There are many attachments that are intended to guide the head of a cutting torch in an accurate circular path. Common to many of these attachments is a center pin and means which fix the center pin to the cutting torch at a distance from the head of the cutting torch equal to the radius of the desired circle or arc. The center pin is placed in a centerpunch mark located at the center of the desired circle or arc and the head of the torch is rotated about the center pin to cut an accurate circle or arc. There is no need to inscribe the circle or arc onto the metal plate. Only the center of the circle need be located and punched.

Most attachments utilize a variety of center pins including straight center pins and offset center pins to provide them with the capability of cutting circles with a wide range of radii. The primary difference between many of the available attachments is the means by which the center pin is fixed on the cutting torch. The simplest and least cumbersome attachments fix the center pin to a single clamping member that clamps onto the tubes that extend between the handle portion and the head portion of the cutting torch. Examples of such attachments are disclosed in U.S. Pat. No. 1,359,155 to Davis, U.S. Pat. No. 1,564,636 to Smith, U.S. Pat. No. 1,792,317 to Marsh and U.S. Pat. No. 2,743,101 to Clark and in Australian Pat. No. 223,932 to Steenbergen. These attachments are well adapted for attaching to the most common cutting torches having two tubes aligned in the same vertical plane. However, some cutting torches have three tubes arranged in a triangular configuration, with either a single upper tube and two lower tubes or two upper tubes and a single lower tube. Because of the nature of the clamping members employed by each of these attachments, they cannot be conveniently attached to cutting torches having tubes arranged in a triangular configuration.

Because cutting a straight line freehand with a cutting torch is also very difficult, an attachment which helps guide the cutting torch in a straight line is often useful. Since a single cutting torch may alternatively be used in making circular cuts and straight cuts, it is desirable if one attachment is capable of accomplishing both tasks with a minimum of adjustments.

Consequently, a need still exists for an attachment for a cutting torch that may clamp onto the tubes of the cutting torch regardless of whether the tubes are aligned in the same vertical plane or are arranged in a triangular configuration and may easily be adapted for making both circular cuts and straight cuts.

SUMMARY OF THE INVENTION

The present invention provides a cutting torch attachment designed to satisfy the aforementioned needs by avoiding the drawbacks of the prior art without introducing other drawbacks. The cutting torch attachment of the present invention, which is adapted for use with a cutting torch having a plurality of tubes extending between a handle portion and a head portion of the torch, comprises: (a) a center locating member having an upper end portion and a lower pointed end for engaging a surface of a workpiece; (b) a support member which includes a top portion having a first bore defined vertically therethrough and an internal screw thread formed in the top portion within the bore, a bottom portion underlying and spaced below the top portion, and means for securing the upper end portion of the center locating member to the bottom portion of the support member; (c) an actuating stem disposed through the first bore in the top portion of the support member, the actuating stem having an upper end disposed above the top portion of the support member, a lower end disposed below the top portion of the support member, and an external screw thread defined on the actuating stem between the upper and lower ends thereof and threadably engaged with the internal screw thread in the first bore of the top portion of the support member; and (d) a clamping member rotatably mounted on the lower end of the actuating stem below the top portion and above the bottom portion of the support member such that by turning the actuating stem in one direction relative to the support member the clamping member is moved downward toward the bottom portion of the support member so as to clamp the tubes of the cutting torch between the clamping member and the bottom portion of the support member, whereas by turning the actuating stem in an opposite direction relative to the support member the clamping member is moved upward away from the bottom portion of the support member to unclamp from the tubes of the cutting torch.

The cutting torch attachment of the present invention also comprises means such as a plurality of concave recesses defined on a lower surface of the clamping member and an upper surface of the bottom portion of the support member for matably engaging the tubes. The cutting torch attachment of the present invention further comprises a guide fixture rod and means defined on the bottom portion of the support member for securing the guide fixture rod to the support member.

One feature of the cutting torch attachment of the present invention is that when clamped to the tubes of a cutting torch, the attachment functions as a guide for cutting accurate circles or circular arcs. The center locating member is placed in a centerpunch mark located at the center of the desired circle on a workpiece and the torch is rotated about the center locating member to cut the circle or arc. Since the distance between the center locating member and the head of the torch is fixed, as long as the center locating member does not move from the centerpunch mark the circle or arc that is cut will be accurate.

Another feature of the cutting torch attachment of the present invention is the simple and manageable means by which it attaches to the tubes of a cutting torch. The attachment is positioned so that the tubes of the cutting torch are between the clamping member and the bottom portion of the support member and then the actuating stem is turned to move the clamping member downward until the tubes are clamped between the lower surface of the clamping member and the upper surface of the bottom portion of the support member. It is easily removed by turning the actuating stem in the opposite direction to move the clamping member upward. The clamping member is fixed on the tubes so that the distance between the center locating member and the head of the torch equals the radius of the desired circle or arc. A center locating member having its upper end portion and lower pointed end in an offset configuration may be utilized to provide a greater range of radii.

A further feature of the cutting torch attachment of the present invention is that it may accommodate the most common cutting torches having two or more tubes aligned in the same vertical plane or cutting torches having three tubes arranged in a triangular configuration. The lower surface of the clamping member and the upper surface of the bottom portion of the support member both extend far enough from end to end to contact a pair of tubes aligned side-by-side in the same horizontal plane. This allows the attachment to clamp onto a cutting torch having a single upper tube and two lower tubes or a cutting torch having two upper tubes and a single lower tube.

An additional feature of the cutting torch attachment of the present invention is that it can easily be adapted for making straight cuts by the addition of a guide fixture rod and means for attaching the guide fixture rod to the bottom portion of the support member, such as a second horizontal bore in the bottom portion. This feature allows the attachment to make both circular cuts and straight cuts without the need to remove it from the cutting torch and replace it with another attachment.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 5 is a side elevational view of the cutting torch attachment shown clamped onto three tubes of a cutting torch having a triangular arrangement.

FIG. 6 is a side elevational view of the cutting torch attachment shown clamped onto three tubes of a cutting torch having a triangular arrangement which is the inverse of that shown in FIG. 5.

FIG. 7 is a vertical sectional view of a modified bottom portion of the cutting torch attachment having a guide fixture rod secured therethrough instead of a center locating member.

FIG. 8 is a horizontal sectional view of the modified bottom portion of the cutting torch attachment taken along line 8—8 in FIG. 7.

FIG. 9 is a perspective view showing a plurality of different center locating members and a guide fixture rod which are employed with the cutting torch attachment.

DETAILED DESCRIPTION OF THE INVENTION

Figure 1:
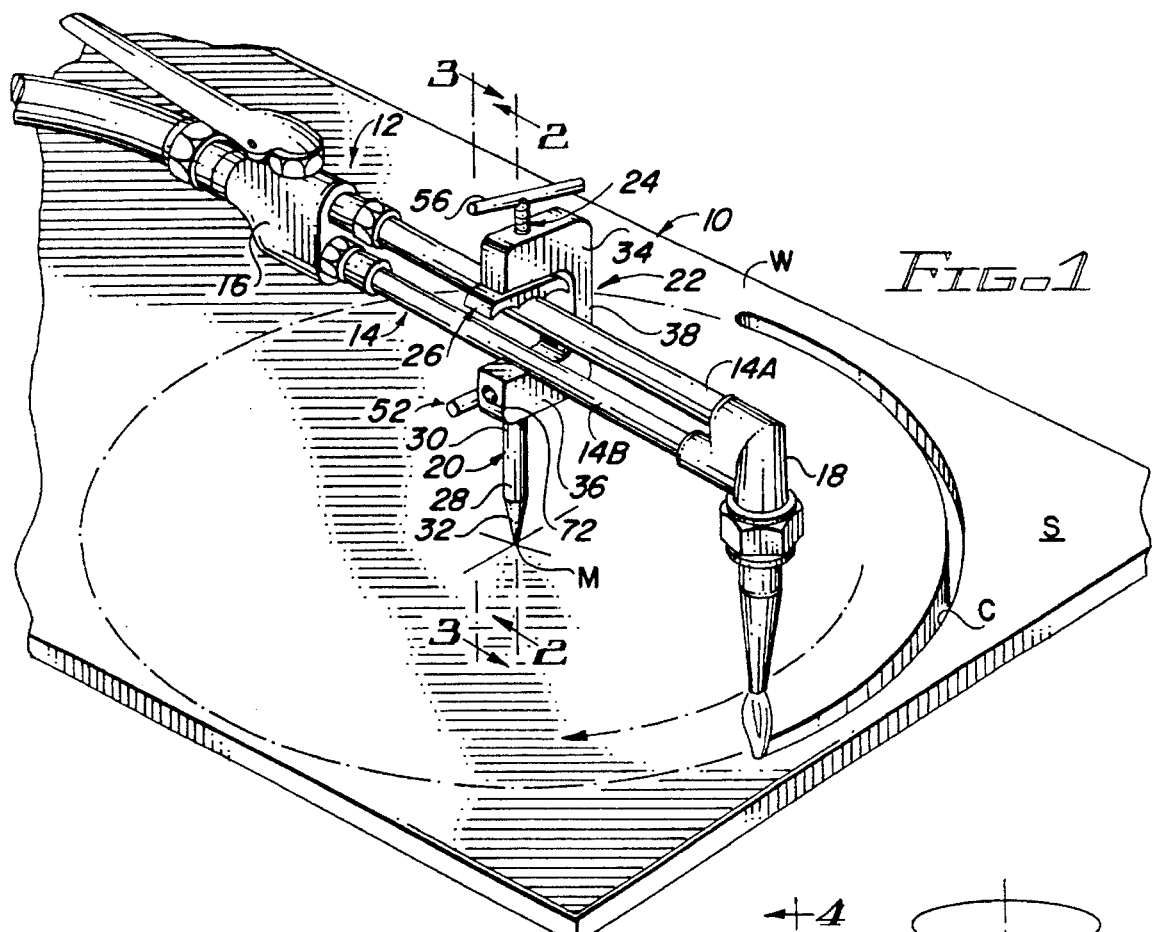
FIG. 1 is a perspective view of a cutting torch attachment of the present invention clamped onto a pair of vertically spaced tubes of a cutting torch and pivotally mounting the torch to cut a circle from a metal plate.

Referring to the drawings and particularly to FIGS. 1–4, there is illustrated a cutting torch attachment of the present invention, generally designated 10. The cutting torch attachment 10 is designed to clamp onto a cutting torch 12 having a plurality of tubes 14 extending between a handle portion 16 and a head portion 18 of the torch 12. When clamped onto the torch 12, the attachment 10 facilitates cutting of an accurate circle or circular arc C from a workpiece W, such as metal plate.

Referring to FIGS. 1–6, the attachment 10 basically includes a center locating member 20, a support bracket or member 22, an actuating stem 24 and a clamping member 26. The center locating member 20 of the attachment 10 is an elongated shaft 28 having an upper end portion 30 and a lower pointed end 32 for engaging the surface S of the workpiece W. As illustrated in FIG. 9, a variety of center locating members 20 can be employed at separate times. These center locating members 20 have different configurations, including a straight shaft 28A, an offset shaft 28B, and a conical pointed end 32A, and can be utilized to provide the attachment 10 with the capability of cutting circles having a greater range of radii than provided by an attachment having only a straight shaft 28A.

The support member 22 of the attachment 10 has a top portion 34, a bottom portion 36 and a middle portion 38 extending between and integrally connected to top and bottom portions 34, 36 such that the top and bottom portions 34, 36 extend outwardly in the same direction from opposite ends of the middle portion 38 with the bottom portion 36 vertically spaced below and underlying the top portion 34 so as to provide the support bracket or member 22 with a generally C-shaped configuration. The top portion 34 of the support member 22 has a first bore 40 defined vertically therethrough and being open at opposite upper and lower surfaces 34A, 34B of the top portion 34. The top portion 34 also has an internal screw thread 42 formed therein within the first bore 40.

The support member 22 also includes means 44 for securing the upper end portion 30 of the shaft 28 of the center locating member 20 to the bottom portion 36 of the support member 22. The securing means 44 includes a second bore 46 and a hole 48 defined in a generally orthogonal intersecting relationship to one another in the bottom portion 36 of the support member 22. The second bore 46 extends vertically upward from a lower surface 36A of the bottom portion 36 into but not through the bottom portion 36 and is adapted to receive the upper end portion 30 of the shaft 28 of the center locating member 20 such that the center locating member 20 extends downwardly from the support member 22. The hole 48 extends horizontally from a side of the bottom portion 36 into the bottom portion 36 to the second bore 46 therein. The bottom portion 36 of the support member 22 has an internal screw thread 50 formed thereon in the hole 48. The securing means 44 also includes a set adjustment member or screw 52 having an external screw thread 54 defined on one end portion. The threaded end portion of the set screw 52 is inserted into the hole 48 and threadably engaged with the internal screw thread 50 in the hole 48. The set screw 52 is generally L-shaped to provide an extended handle 56 on the other end portion thereof for grasping when tightening the set screw 52.

Thus, by rotating the set screw 52 in one direction relative to the support member 22, an inner end 52A of the set screw 52 is advanced toward and tightened against the upper end portion 30 of the shaft 28 of the center locating member 20 to secure it in the second vertical bore 46 in the bottom portion 36 of the support member 22. Conversely, by rotating the set screw 52 in an opposite direction relative to support member 22, the inner end 52A of the set screw 52 is withdrawn away from and untightened from the upper end portion 30 of the shaft 28 of the center locating member 20 to release it from the second vertical bore 46 in the bottom portion 36 of the support member 22.

The actuating stem 24 of the attachment 10 disposed through the first vertical bore 40 in the top portion 34 of the support member 22 and supports the clamping member 26. More particularly, the stem 24 has an upper end 58 disposed above the upper surface 34A of the top portion 34 of the support member 22, a lower end 60 disposed below the lower surface 34B of the top portion 34 of the support member 22, and an external screw thread 62 defined on the stem 24 and extending between the upper and lower ends 58, 60 thereof and threadably engaged with the internal screw thread 42 in the first bore 40 through the top portion 34 of the support member 22. The upper end 58 of the stem 24 is T-shaped, having a handle member 64 rigidly attached thereto and extending transversely of the upper end 58 of the stem 24 so as to facilitate grasping of the actuating stem 24 when turning the stem 24 to clamp or unclamp the tubes 14 of the cutting torch 12.

The clamping member 26 of the attachment 10 is rotatably mounted and secured on the lower end 60 of the actuating stem 24 below the top portion 34 and above the bottom portion 36 of the support member 22 such that by turning the actuating stem 24 in one direction relative to the support member 22, the actuating stem 24 threads downward into the top portion 34 and the clamping member 26 is moved with the stem 24 downward toward the bottom portion 36 of the support member 22 so as to clamp the tubes 14 of the cutting torch 12 between the clamping member 26 and the bottom portion 36 of the support member 22. Conversely, by turning the actuating stem 24 in an opposite direction relative to the support member 22, the actuating stem 24 threads upwardly from the top portion 34 and the clamping member 26 is moved with the stem 24 upward away from the bottom portion 36 of the support member 22 to unclamp from the tubes 14 of the cutting torch 12. Preferably, a plurality of concave recesses 66, 68 are defined in a lower surface 26A of the clamping member 26 and in an upper surface of 36A of the bottom portion 24. The respective concave recesses 66, 68 are shaped to conform to the shape of the tubes 14 so that they will engage the tubes 14 of the cutting torch 12 to more tightly secure the attachment 10 on the torch 12 when the clamping member 26 is moved into the clamping relationship with the bottom portion 36 of the support member 22.

When the attachment 10 is clamped onto the tubes 14 of the cutting torch 12, it is positioned so that the distance between the lower pointed end 32 of the center locating member 20 and the head portion 18 of the torch 12 equals the radius of the desired circle or arc. Once the attachment 10 is clamped on the torch 12 and the proper one of the center locating members 20 is secured to the bottom portion 36 of the support member 22 by properly manipulating the set screw 52, the lower pointed end 32 of the center locating member 20 is placed in a centerpunch mark M located at the center of the desired circle or arc and the head portion 18 of the torch 12 is rotated about the center locating member 20 to cut the desired circle or arc C.

Figure 2:
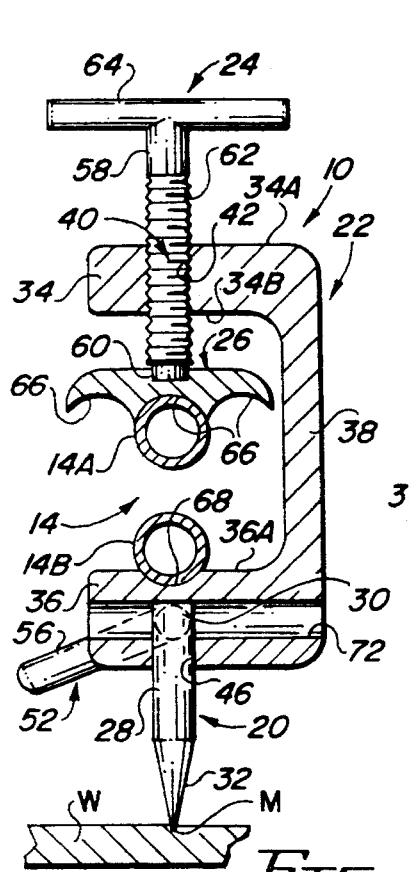
FIG. 2 is an enlarged cross-sectional view of the cutting torch attachment taken along line 2—2 in FIG. 1.
Figure 3:
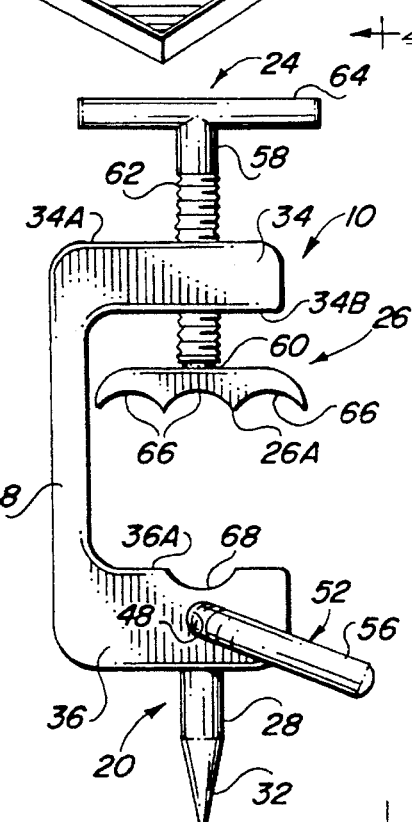
FIG. 3 is a side elevational view of the cutting torch attachment as seen along line 3—3 in FIG. 1.
Figure 4:
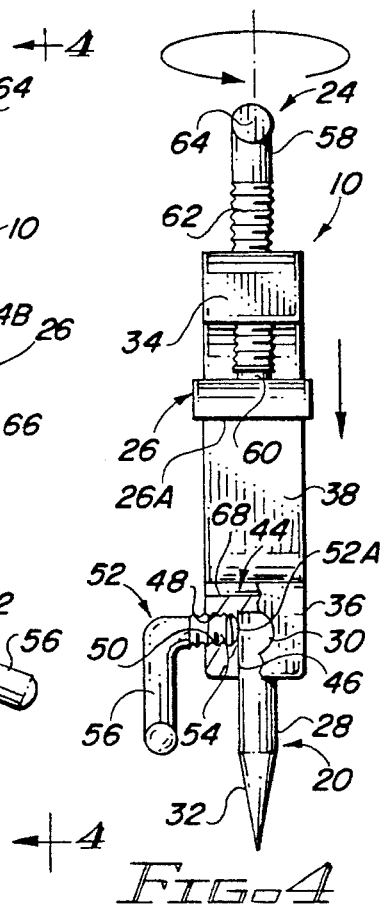
FIG. 4 is an end elevational view of the cutting torch attachment as seen along line 4—4 in FIG. 3 with a bottom portion partially cutaway.

As shown in FIGS. 1 and 2, the attachment 10 is designed to clamp onto a cutting torch 12 having an upper tube 14A and a lower tube 14B aligned in the same vertical plane. As shown in FIGS. 5 and 6, the attachment is also designed to clamp onto a cutting torch 12 having three tubes 14 in a triangular arrangement with two upper tubes 14A and a single lower tube 14B or a single upper tube 14A and two lower tubes 14B.

As seen in FIGS. 7 and 8, the bottom portion 36 of the support member 22 may also include means for securing a guide fixture rod 70 (seen also in FIG. 9) to the bottom portion 36 of the support member 22. The guide fixture rod 70 is employed for cutting straight lines with the cutting torch 12. Preferably, such means include a third bore 72 that extends horizontally through the bottom portion 36 of the support member 22 perpendicular to and intersecting both the second vertical bore 46 and the horizontal hole 48. The set screw 52 may be loosened to remove the center locating member 20 and the guide fixture rod 70 inserted into the third horizontal bore 72 and the set screw 52 then retightened to secure the guide fixture rod 70 to the support member 22 without the need to unclamp the attachment 10 from the torch 12. This feature makes it easy to alternate between cutting accurate circles and straight lines with the torch 12 because there is no need to change the attachment 10 or make several adjustments to the attachment 10.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An attachment for use with a cutting torch having a plurality of tubes extending between a handle portion and a head portion of the torch, said attachment comprising:

(a) a center locating member having an upper end portion and a lower pointed end for engaging a surface of a workpiece;

(b) a support member including
      (i) a top portion having a first bore defined vertically therethrough and an internal screw thread formed in the top portion within the bore,
      (ii) a bottom portion underlying and spaced below said top portion, and
      (iii) means for securing said upper end portion of said center locating member to said bottom portion of said support member;

(c) an actuating stem disposed through said first bore in said top portion of said support member, said actuating stem having an upper end disposed above said top portion of said support member, a lower end disposed below said top portion of said support member, and an external screw thread defined on said actuating stem between said upper and lower ends thereof and threadably engaged with said internal screw thread in said first bore of said top portion of said support member; and (d) a clamping member rotatably mounted on said lower end of said stem actuating below said top portion and above said bottom portion of said support member such that by turning said actuating stem in one direction relative to said support member said clamping member is moved downward toward said bottom portion of said support member so as to clamp the tubes of the cutting torch between said clamping member and said bottom portion of said support member, whereas by turning said actuating stem in an opposite direction relative to said support member said clamping member is moved upward away from said bottom portion of said support member to unclamp from the tubes of the cutting torch.

2. The attachment of claim 1 wherein said actuating stem is T-shaped to provide a transverse handle at said upper end of said actuating stem to facilitate grasping of said actuating stem when turning said actuating stem to clamp or unclamp the tubes of the cutting torch.

3. The attachment of claim 1 wherein said means for securing said center locating member to said support member includes:

a second bore defined in said bottom portion of said support member extending vertically upward from a lower surface thereof into but not through said bottom portion and adapted to receive said upper end portion of said center locating member;

a hole defined in said bottom portion of said support member extending from a side thereof into said bottom portion and transversely relative to and intersecting with the second bore, said hole having an internal screw thread formed therein on said bottom portion of said support member; and a set adjustment member inserted into said hole and having an external screw thread thereon threadably engaged with said internal screw thread in said hole such that by rotating said set adjustment member in one direction relative to said support member an inner end of said set adjustment member is advanced toward and tightened against said upper end portion of said center locating member to secure said center locating member in said second bore in said bottom portion of said support member, whereas by rotating said set adjustment member in an opposite direction relative to said support member said inner end of said set adjustment member is withdrawn away from and untightened from said upper end portion of said center locating member to release said center locating member from said second bore in said bottom portion of said support member.

4. The attachment of claim 3 wherein said set adjustment member is L-shaped to provide an extended handle for grasping when tightening said set adjustment member.

5. The attachment of claim 1 further comprising:

(e) means defined in said lower surface of said clamping member for engaging at least an uppermost tube of the cutting torch.

6. The attachment of claim 5 wherein said means for engaging the uppermost tube of the cutting torch is at least one concave recess defined in said lower surface of said clamping member and extending from one end of said clamping member to an opposite end thereof.

7. The attachment of claim 1 further comprising:

(e) means defined in said upper surface of said bottom portion of said support member for engaging at least a lowermost tube of the cutting torch.

8. The attachment of claim 7 wherein said means for engaging the lowermost tube of the cutting torch is at least one concave recess defined in said upper surface of said bottom portion of said support member and extending from one end of said bottom portion to an opposite end thereof.

9. The attachment of claim 1 further comprising:

(e) a guide fixture rod; and (f) means defined on said bottom portion for securing said guide fixture rod to said support member.

10. The attachment of claim 9 wherein said means for securing said center locating member to said support member and said means for securing said guide fixture rod to said support member include:

a second bore defined in said bottom portion of said support member extending vertically upward from a lower surface thereof into but not through said bottom portion and adapted to receive said upper end portion of said center locating member;

a third bore defined in said bottom portion of said support member extending horizontally from one end of said bottom portion completely through said bottom portion to an opposite end of said bottom portion transversely to and intersecting said second bore and adapted to receive said guide fixture rod therethrough;

a hole defined in said bottom portion of said support member extending from a side thereof into said bottom portion and transversely relative to and intersecting with said second and third bores, said hole having an internal screw thread formed therein on said bottom portion of said support member; and a set adjustment member inserted into said hole and having an external screw thread thereon threadably engaged with said internal screw thread in said hole such that by rotating said set adjustment member in one direction relative to said support member an inner end of said set adjustment member is advanced toward and tightened against one or the other of said upper end portion of said center locating member to secure said center locating member in said second bore or of a portion of said guide fixture rod to secure said guide fixture rod in said third bore, whereas by rotating said set adjustment member in an opposite direction relative to said support member said inner end of said set adjustment member is withdrawn away from and untightened from one or the other of said upper end portion of said center locating member to release said center locating member from said second bore or of said portion of said guide fixture rod to release said guide fixture rod from said third bore.

11. An attachment for use with a cutting torch having a plurality of tubes extending between a handle portion and a head portion of the torch, said attachment comprising:

(a) a center locating member having an upper end portion and a lower pointed end for engaging a surface of a workpiece;

(b) a support member having a C-shaped configuration, said support member including (i) a top portion having a first bore defined vertically therethrough and an internal screw thread formed in the top portion within the bore, (ii) a bottom portion, (iii) a middle portion extending between and rigidly connected to said top and bottom portions such that said top and bottom portions extend outwardly in the same direction from opposite ends of said middle portion with said bottom portion vertically spaced below and underlying said top portion so as to define said C-shaped configuration of said support member, and (iv) means for securing said upper end portion of said center locating member to said bottom portion of said support member;

(c) an actuating stem disposed through said first bore in said top portion of said support member and extending substantially parallel to said middle portion of said support member, said actuating stem having an upper end disposed above said top portion of said support member, a lower end disposed below said top portion of said support member, and an external screw thread defined on said actuating stem between said upper and lower ends thereof and threadably engaged with said internal screw thread in said first bore of said top portion of said support member; and (d) a clamping member rotatably mounted on said lower end of said actuating stem below said top portion and above said bottom portion of said support member such that by turning said actuating stem in one direction relative to said support member said clamping member is moved downward toward said bottom portion of said support member so as to clamp the tubes of the cutting torch between said clamping member and said bottom portion of said support member, whereas by turning said actuating stem in an opposite direction relative to said support member said clamping member is moved upward away from said bottom portion of said support member to unclamp from the tubes of the cutting torch.

12. The combination of claim 11 wherein said actuating stem is T-shaped to provide a transverse handle at said upper end of said actuating stem to facilitate grasping of said actuating stem when turning said actuating stem to clamp or unclamp the tube of the cutting torch.

13. The combination of claim 11 wherein said means for securing said center locating member to said support member includes:

a second bore defined in said bottom portion of said support member extending vertically upward from a lower surface thereof into but not through said bottom portion and adapted to receive said upper end portion of said center locating member;

a hole defined in said bottom portion of said support member extending from a side thereof into said bottom portion and transversely relative to and intersecting with the second bore, said hole having an internal screw thread formed therein on said bottom portion of said support member; and a set adjustment member inserted into said hole and having an external screw thread thereon threadably engaged with said internal screw thread in said hole such that by rotating said set adjustment member in one direction relative to said support member an inner end of said set adjustment member is advanced toward and tightened against said upper end portion of said center locating member to secure said center locating member in said second bore in said bottom portion of said support member, whereas by rotating said set adjustment member in an opposite direction relative to said support member said inner end of said set adjustment member is withdrawn away from and untightened from said upper end portion of said center locating member to release said center locating member from said second bore in said bottom portion of said support member.

14. The combination of claim 13 wherein said set adjustment member is L-shaped to provide an extended handle for grasping when tightening said set adjustment member.

15. The combination of claim 11 further comprising:

(e) means defined in said lower surface of said clamping member for engaging at least an uppermost tube of the cutting torch.

16. The combination of claim 15 wherein said means for engaging the uppermost tube of the cutting torch is at least one concave recess defined in said lower surface of said clamping member and extending from one end of said clamping member to an opposite end thereof.

17. The attachment of claim 11 further comprising:

(e) means defined in said upper surface of said bottom portion of said support member for engaging at least a lowermost tube of the cutting torch.

18. The attachment of claim 17 wherein said means for engaging the lowermost tube of the cutting torch is at least one concave recess defined in said upper surface of said bottom portion of said support member and extending from one end of said bottom portion to an opposite end thereof.

19. The attachment of claim 11 further comprising:

(e) a guide fixture rod; and (f) means defined on said bottom portion for securing said guide fixture rod to said support member.

20. The attachment of claim 19 wherein said means for securing said center locating member to said support member and said means for securing said guide fixture rod to said support member include:

a second bore defined in said bottom portion of said support member extending vertically upward from a lower surface thereof into but not through said bottom portion and adapted to receive said upper end portion of said center locating member;

a third bore defined in said bottom portion of said support member extending horizontally from one end of said bottom portion completely through said bottom portion to an opposite end of said bottom portion transversely to and intersecting said second bore and adapted to receive said guide fixture rod therethrough;

a hole defined in said bottom portion of said support member extending from a side thereof into said bottom portion and transversely relative to and intersecting with said second and third bores, said hole having an internal screw thread formed therein on said bottom portion of said support member; and a set adjustment member inserted into said hole and having an external screw thread thereon threadably engaged with said internal screw thread in said hole such that by rotating said set adjustment member in one direction relative to said support member an inner end of said set adjustment member is advanced toward and tightened against one or the other of said upper end portion of said center locating member to secure said center locating member in said second bore or of a portion of said guide fixture rod to secure said guide fixture rod in said third bore, whereas by rotating said set adjustment member in an opposite direction relative to said support member said inner end of said set adjustment member is withdrawn away from and untightened from one or the other of said upper end portion of said center locating member to release said center locating member from said second bore or of said portion of said guide fixture rod to release said guide fixture rod from said third bore.

* * * * *